US011433986B2

(12) United States Patent
Breigenzer et al.

(10) Patent No.: US 11,433,986 B2
(45) Date of Patent: Sep. 6, 2022

(54) MOVABLE BARRIER WITH PRESSURE EQUALIZATION FEATURES

(71) Applicant: THE BOEING COMPANY, Chicago, IL (US)

(72) Inventors: Thomas J. Breigenzer, Mukilteo, WA (US); William C. Haas, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 118 days.

(21) Appl. No.: 16/821,597

(22) Filed: Mar. 17, 2020

(65) Prior Publication Data
US 2021/0291955 A1    Sep. 23, 2021

(51) Int. Cl.
| | | |
|---|---|---|
| B64C 1/14 | (2006.01) | |
| E06B 5/12 | (2006.01) | |
| B64D 45/00 | (2006.01) | |
| B64D 11/00 | (2006.01) | |
| B64C 1/00 | (2006.01) | |

(52) U.S. Cl.
CPC ............ B64C 1/1469 (2013.01); E06B 5/125 (2013.01); *B64C 2001/009* (2013.01); *B64D 11/0023* (2013.01); *B64D 45/0026* (2019.08)

(58) Field of Classification Search
CPC ............ B64C 1/1469; B64C 2001/009; B64D 11/0023; B64D 45/0026; E06B 5/125
See application file for complete search history.

(56) References Cited

U.S. PATENT DOCUMENTS

| | | | | |
|---|---|---|---|---|
| 4,597,549 A | * | 7/1986 | Ryan | .......................... B64C 1/10 160/127 |
| 5,573,053 A | * | 11/1996 | Hanemaayer | ............ E05D 15/26 160/206 |
| 6,702,230 B2 | * | 3/2004 | Movsesian | ............. B64C 1/1469 244/118.5 |
| 7,600,716 B2 | * | 10/2009 | French | ................ B64D 45/0028 244/129.5 |
| 7,823,834 B2 | * | 11/2010 | French | ................... B64C 1/1469 244/129.5 |
| 2003/0189131 A1 | * | 10/2003 | Cloud | ................. B64D 45/0028 244/118.5 |
| 2004/0177561 A1 | * | 9/2004 | Youssef | ................. E05B 63/143 49/394 |
| 2006/0065782 A1 | * | 3/2006 | French | ................... B64C 1/1469 244/118.5 |
| 2006/0169839 A1 | * | 8/2006 | French | ................ B64D 45/0028 244/118.5 |

(Continued)

*Primary Examiner* — Justin B Rephann
(74) *Attorney, Agent, or Firm* — Patterson + Sheridan, LLP

(57) ABSTRACT

Certain aspects of the present disclosure provide movable barrier, including: a frame having a first side and a second side parallel to the first side; a first exterior panel connected to the first side of the frame and including: a first non-planar profile; and a first plurality of perforations; a second exterior panel connected to the second side of the frame and including: a second non-planar profile; and a second plurality of perforations; a cavity defined between the first exterior panel and the second exterior panel; and a liner disposed within the cavity and configured to: deform when an air pressure differential acting on a first side of the liner exceeds a pressure differential threshold and allow increased airflow through the movable barrier.

20 Claims, 13 Drawing Sheets

(56) References Cited

U.S. PATENT DOCUMENTS

2006/0169840 A1\* 8/2006 French .............. B64D 45/0028
  244/118.5
2020/0224462 A1\* 7/2020 Renner ................ E05B 47/026

\* cited by examiner

MOVABLE BARRIER WITH PRESSURE EQUALIZATION FEATURES

INTRODUCTION

Aspects described herein relate to movable barriers, which may generally be used for privacy and security in a variety of contexts. For example, movable barriers may be used in commercial vehicles, such as aircraft, watercraft, trains, and busses, as well as in structures, such as offices and factories, to name just a few examples.

Conventional movable barriers, such as doors, may perform well as secure partitions between spaces, but are generally not designed to mitigate dynamic changes to the ambient environments in such spaces. For example, when a large pressure differential develops across two sides of a barrier, for example in an aircraft experiencing a rapid change in cabin pressure, the barrier may not allow sufficient airflow from one side to the other to avoid damage to the barrier, structures affixed to the barrier (e.g., a bulkhead, a floor, a ceiling), and the like. While providing openings in a barrier may mitigate this issue (e.g., by allowing airflow through the barrier to allow for continued safe flying), the same openings reduce the strength, security, and privacy provided by the barrier.

Accordingly, improved movable barriers are needed that can mitigate sudden pressure differentials while maintaining the privacy and security functions of the barrier.

BRIEF SUMMARY

In a first embodiment, a movable barrier, includes: a frame having a first side and a second side parallel to the first side; a first exterior panel connected to the first side of the frame and including: a first non-planar profile; and a first plurality of perforations; a second exterior panel connected to the second side of the frame and including: a second non-planar profile; and a second plurality of perforations; a cavity defined between the first exterior panel and the second exterior panel; and a liner disposed within the cavity and configured to: deform when an air pressure differential acting on a first side of the liner exceeds a pressure differential threshold and allow increased airflow through the movable barrier.

In a second embodiment, a movable barrier, includes: a first exterior panel, comprising: a first inner side; a first outer side; a first non-planar profile; and a first plurality of perforations; a second exterior panel, comprising: a second inner side; a second outer side; a second non-planar profile; a second plurality of perforations, wherein one or more portions of the first inner side of the first exterior panel are connected to one or more portions of the second inner side of the second exterior panel; a plurality of cavities formed between the first exterior panel and the second exterior panel; and a plurality of liners disposed within the plurality of cavities and configured to: deform when an air pressure acting on a first side of the plurality of liners exceeds a pressure differential threshold and allow increased airflow through the movable barrier.

BRIEF DESCRIPTION OF THE DRAWINGS

The appended figures depict aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide a movable barrier that can selectively allow air passage from one side of the barrier to another while providing the privacy and security functions of a solid barrier.

In some embodiments, each side of a movable barrier includes perforations (or apertures) to allow for airflow through the barrier. Further, a deformable liner is located between each side of the movable barrier and configured to deform (e.g., tear, fold, displace, or move) when a pressure on at least one side of the deformable liner exceeds a threshold pressure difference as compared to the other side of the deformable liner, or in other words, when a differential pressure exceeding a threshold exists across the deformable liner. In this way, the deformable liner provides privacy (e.g., preventing sight through the physical perforations in the barrier) and security (e.g., preventing noxious or toxic gases through physical perforations in the barrier) under normal operation, but deforms and allows rapid pressure equalization during a differential pressurization event, such as a depressurization of one part of a vehicle (e.g., an aircraft) separated from another part of the vehicle by the movable barrier.

The movable barriers described herein may be implemented in various types of vehicles or structures where privacy and security are desirable, and where differential pressurization events are possible. In one example, a movable barrier such as described herein may be used to secure a first area of an aircraft (e.g., a flight deck hallway) from a second area of the aircraft (e.g., a main cabin).

Examples of Movable Barriers Installed on Aircraft

Figure 1A:
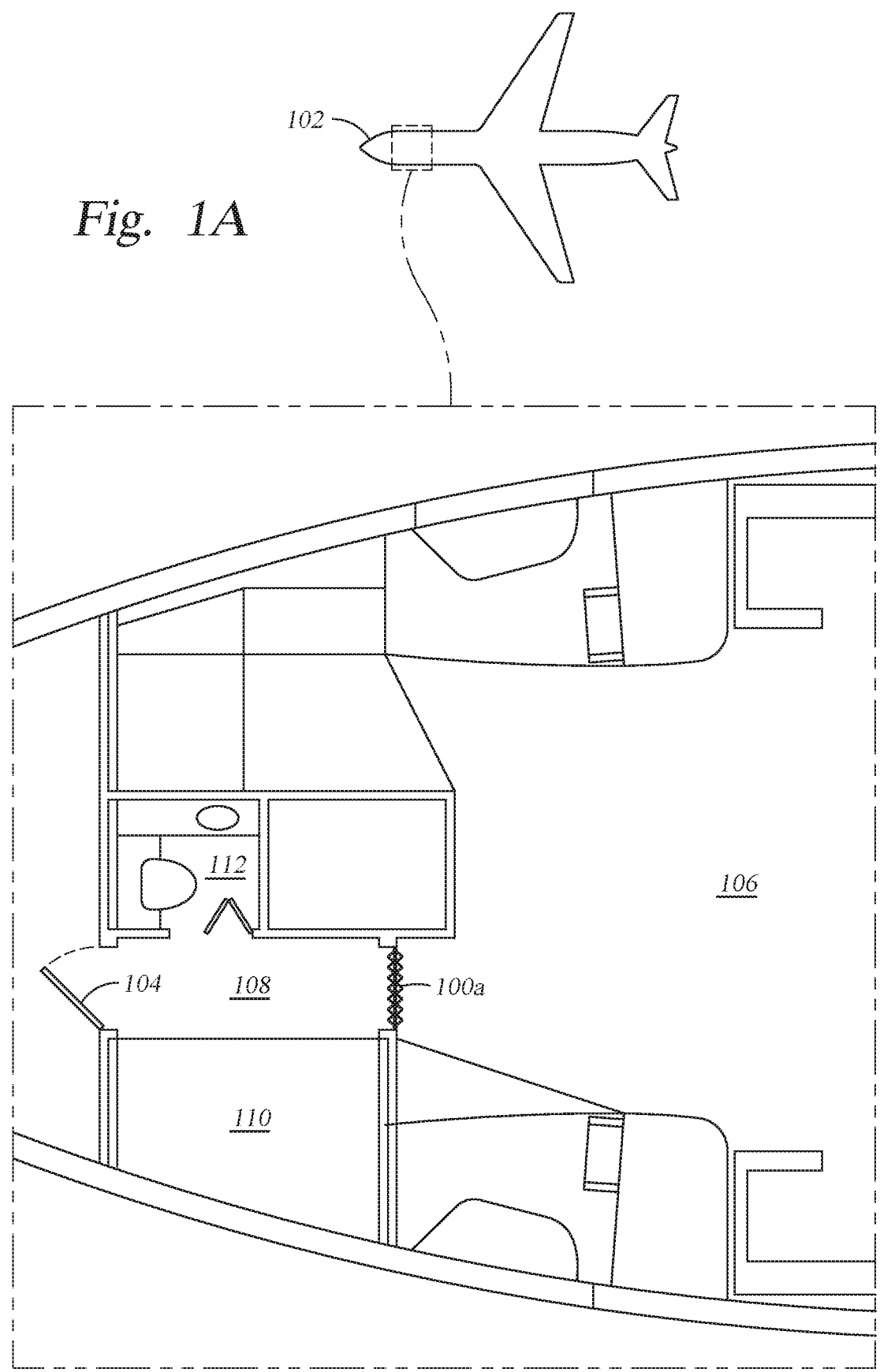
FIG. 1A depicts an embodiment of a movable barrier installed in an aircraft and secured in a closed position.
Figure 1B:
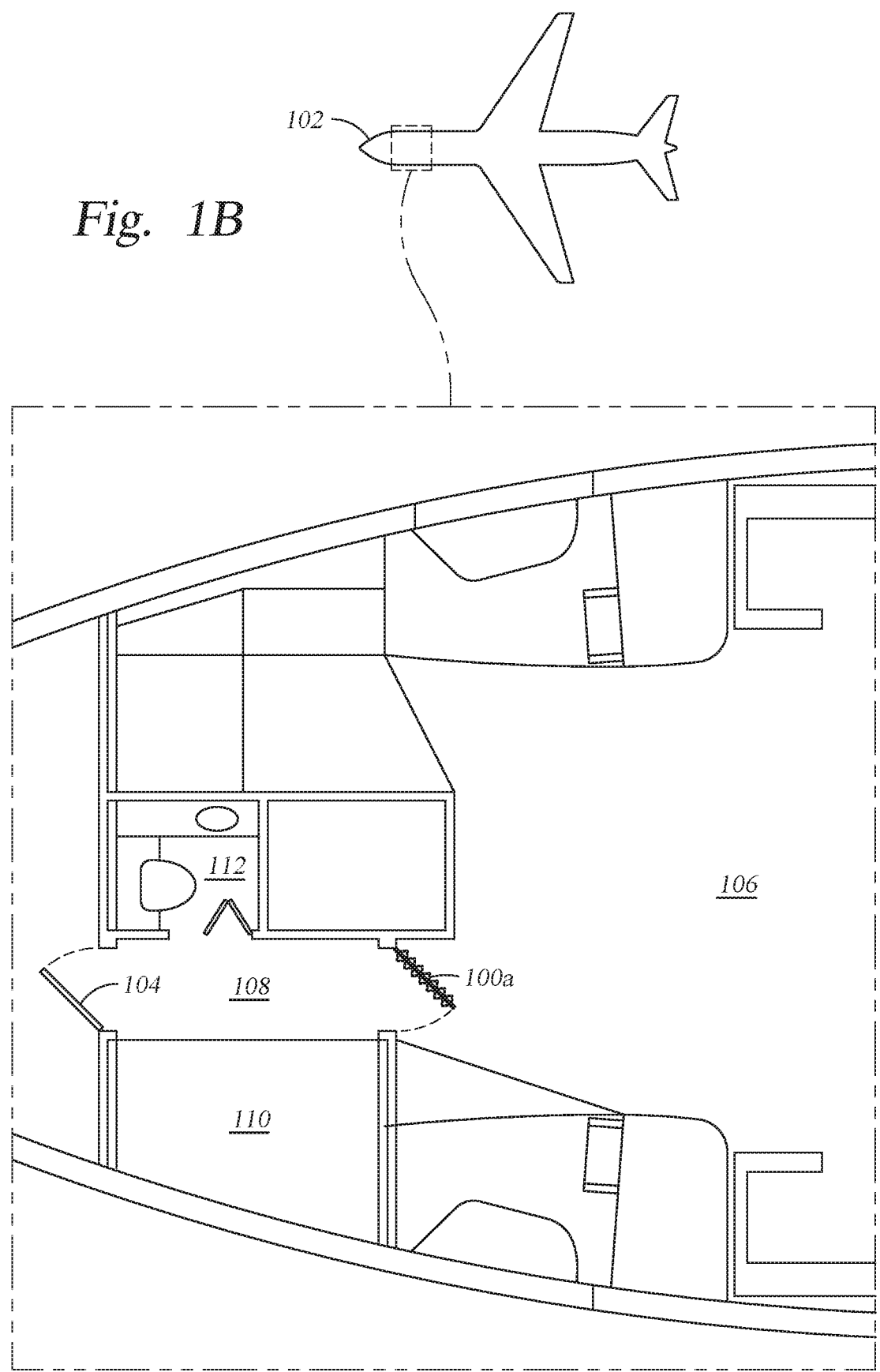
FIG. 1B depicts an embodiment of a movable barrier installed in an aircraft and positioned in a partially-opened open position.
Figure 1C:
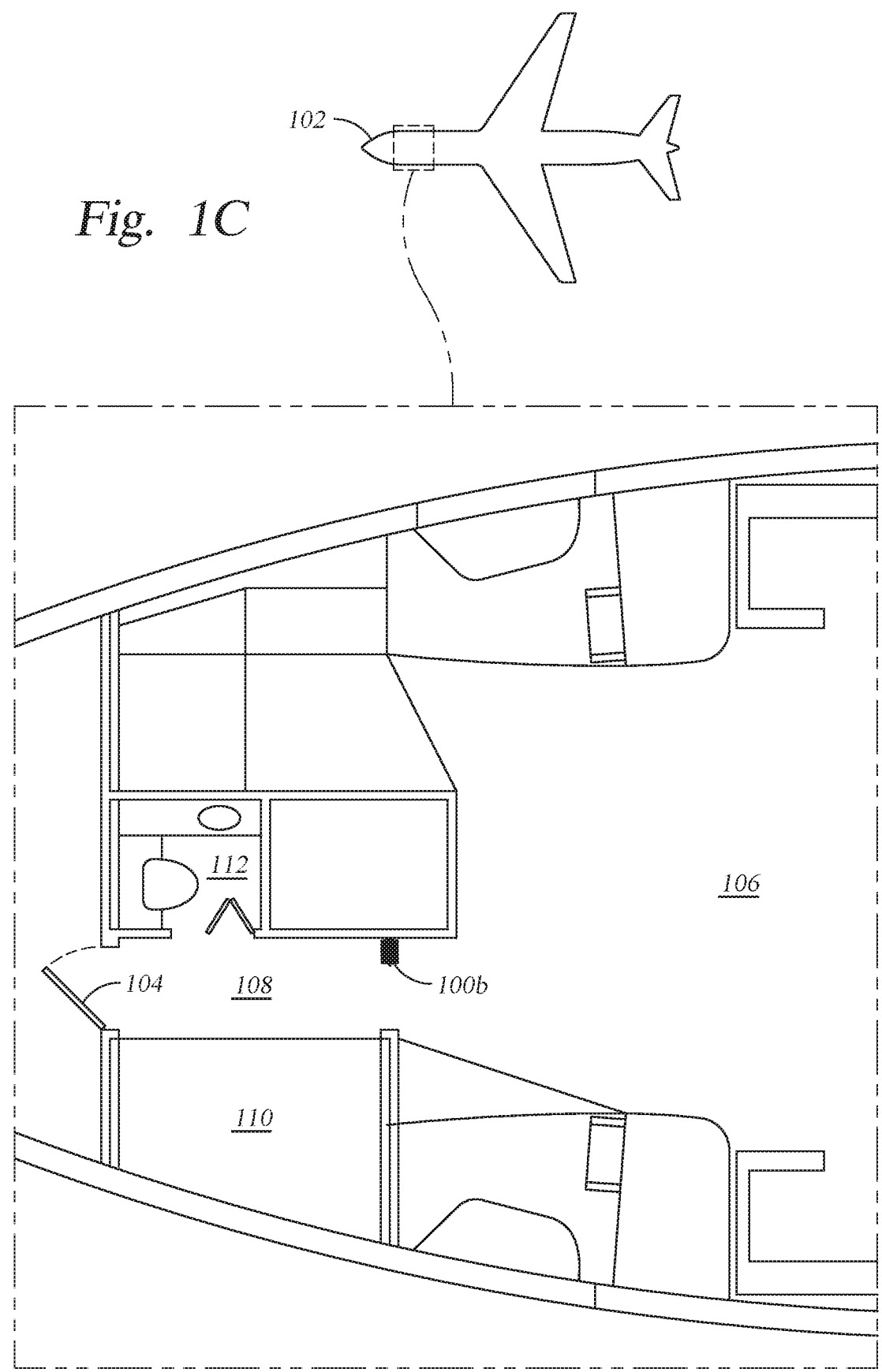
FIG. 1C depicts an embodiment of a movable barrier installed in an aircraft and positioned in a folded and open position.

FIGS. 1A, 1B, and 1C depict an overhead view of different embodiments of movable barriers installed in an aircraft 102. Notably, while embodiments of movable barriers depicted herein are described in the context of an aircraft as one example, such embodiments may be equally adapted to other vehicles or structures.

In particular, FIG. 1A depicts an embodiment of a movable barrier 100a installed in an aircraft 102. In the depicted example, movable barrier 100a is installed in a flight deck hallway 108 between a flight deck door 104 and a main cabin 106. When secured in a closed position, a person cannot see through movable barrier 100a (as described in more detail below with respect to FIG. 3B), which is beneficial to providing security in flight deck hallway 108. For example, when in a closed position, movable barrier 100a does not allow persons in main cabin 106 to see when flight deck door 104 is open or to see when certain flight crew, such as a pilot, are out of the flight deck. Further, a flight crew rest area 110 and a bathroom 112 cannot be seen from main cabin 106 when movable barrier 100a is closed.

FIG. 1B depicts movable barrier 100a partially-opened towards main cabin 106. Notably, in other examples, movable barrier 100a may be mounted and opened along a different direction, such as opened toward flight deck hallway 108. When movable barrier 100a is open, flight crew can easily travel between main cabin 106 and flight deck hallway 108.

FIG. 1C depicts an alternative embodiment of a movable barrier 100b that is configured to fold upon itself in an accordion fashion. The foldable configuration may be beneficial when swing space for movable barrier 100b is limited, or when movable barrier 100b would otherwise obstruct other aspects of aircraft operation when in an open position and space does not permit for a storage compartment.

Example Movable Barrier with a Frame

Figure 2:
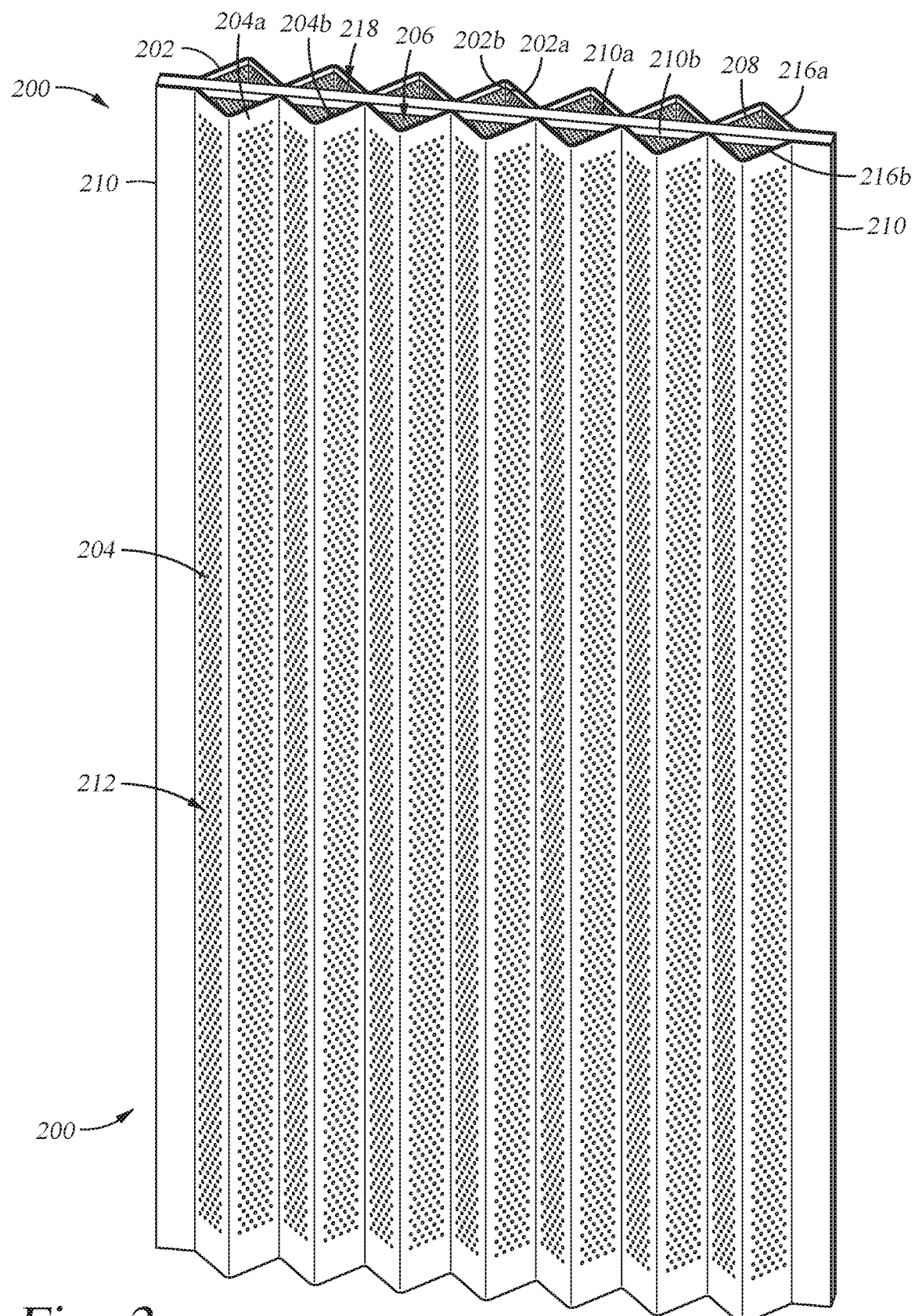
FIG. 2 depicts an embodiment of a movable barrier.

FIG. 2 depicts an embodiment of a movable barrier 200 with an internal frame structure 210.

In the depicted embodiment, a first exterior panel 202 and a second exterior panel 204 are connected to frame 210 such that a first inner side 202b of first exterior panel 202 is connected to a first side 210a of frame 210 and a second inner side 204b of second exterior panel 204 is connected to a second side 210b of frame 210. In this example, frame 210 is shown as a rectangular shape, generally tracing the contour of movable barrier 200, but in other embodiments frame 210 can be alternative shapes and geometries. For example, other embodiments of frame 210 may include bars (e.g., lateral bars spanning the width of barrier 200 and/or longitudinal bars spanning the height of barrier 200) for extra security and support. Notably, such bars in an open-structure frame allow air to move through movable barrier 200, as described herein. In other examples, an external frame may be used and configured to provide an overlying structure to exterior panels 202 and 204.

In the example depicted in FIG. 2, a first outer side 202a of first exterior panel 202 may face the flight deck door (e.g., flight deck door 104 in FIG. 1A) and a second outer side 204a of second exterior panel 204 may face the main cabin (e.g., main cabin 106 in FIG. 1A) of an aircraft when installed in the manner depicted in FIG. 1A.

A cavity (or volume) 206 is formed between first inner side 202b and second inner side 204b, which is further bordered by frame 210 within movable barrier 200. In other examples first inner side 202b and second inner side 204b may be connected together (e.g., along seam lines) to form a plurality of cavities (e.g., cavities 406a, 406b, 406c in FIG. 4). Cavity 206 allows air to flow through movable barrier 200 as described below, for example, with respect movable barrier 300 and cavity 306 of FIGS. 3A-3C.

In the example depicted in FIG. 2, exterior panels 202 and 204 have a plurality of perforations 212 to allow air to flow through barrier 200 under certain conditions, as described further below, while maintaining structural rigidity.

In some embodiments, perforations 212 may create an open area of 50-70% on the panels. Further, the size of the perforations may be selected in conjunction with the angle of the exterior panel corrugations to ensure a sufficient venting area. Generally, embodiments may have corrugation angles and perforation sizes selected to achieve 90-100% of the existing vent area before a barrier, such as barrier 200, is added. For example, an exterior panel with approximately 45-degree corrugations may have perforations sized for approximately 71% open area to achieve 100% of existing vent area, while a 60-degree panel may have perforations sized for approximately 50% open area to achieve approximately 100% of existing vent area. Notably, these are just some options, and many others are possible.

Further in this example, first exterior panel 202 has a non-planar profile 216a, and second exterior panel 204 has a non-planar profile 216b. Generally, a non-planar profile is a profile that does not lie in or is not confined to the same plane. In this example, the non-planar profiles 216a and 216b are corrugated profiles (e.g., a profile shaped into alternate ridges and grooves). The non-planar profiles 216a and 216b beneficially increase the surface area of exterior panels 202 and 204, which allows more airflow along the length of barrier 200. In some embodiments, the additional surface area allows the perforations to be smaller while still allowing sufficient air to flow through barrier 200, as described in more detail with respect to FIGS. 3A-3C.

In the example depicted in FIG. 2, non-planar profiles 216a and 216b are shown as a uniform pattern on exterior panels 202 and 204. Other examples may utilize different patterns and may not be uniform across multiple panels or even one panel.

In the example depicted in FIG. 2, a deformable liner 208 is affixed against first inner side 202b of first exterior panel 202 (such as depicted in more detail in FIGS. 3B, 3C, 3D, and 3E). Deformable liner 208 is configured so that when a pressure differential exceeds a threshold, such as 0.25 PSI, deformable liner 208 deforms and allows air to pass through. For example, deformable liner 208 may tear or otherwise break away from the interior surface of exterior panel 202, allowing air to flow through during a differential pressurization event. Thus, deformable liner 208 may prevent collateral damage, such damage to floors, ceilings, bulkheads, storage areas, and the like, when a differential pressurization event occurs, such as a rapid decompression in one part of an aircraft separated from another part of the aircraft by a movable barrier including deformable liner 208.

In some embodiments, the deformation may be temporary, such that when the pressure differential is removed, deformable liner 208 returns to an undeformed state, and resumes its function of preventing visibility and transmission of air. In other embodiments, deformable liner 208 may be permanently deformed, such as by tearing, ripping, or separating from its attached surface.

In some embodiments, deformable liner 208 is made from a porous material. A porous liner may be chosen reduce transmission of certain gases (e.g., poisonous gases and/or noxious fumes) while still allowing some air to flow through. In some embodiments, deformable liner 208 may include micropores, which are generally pores with a diameter of less than 2 nm. The porosity of liner 208 may be beneficial in situations where a small pressure gradient is expected, such as between a flight deck and other parts of an aircraft because the flight deck may be maintained at a slightly higher pressure than the rest of the aircraft.

In some embodiments, deformable liner 208 may include patterns of pores 218, which contribute to the deformation capability of liner 208 when a pressure differential from one side to another exceeds a threshold. For example, a pattern of pores may contribute to the deformation characteristic (e.g., tearing) of a deformable liner.

Deformable liner 208 may be retained within barrier 200 by various means. In one embodiment, a biasing mechanism, such as a spring, clip, fastener, or the like, (such as depicted in FIGS. 3B, 3C, 3D, and 3E) may be used to retain deformable liner 208 to inner side 202b or 204b of one of the exterior panels 202 or 204, such as to the first inner side 202b of first exterior panel 202 in FIG. 2. In another embodiment, an adhesive may be used to retain deformable liner 208, such as an adhesive on inner side 202b or 204b of an exterior panel 202 or 204, or an adhesive on a portion of frame 210.

Generally, the position of deformable liner 208 affects which way the liner will deform and thus which way air is allowed to flow when deformable liner deforms in response to a differential pressurization event. Some embodiments are unidirectional and only deform in one direction. For example, in FIG. 2, deformable liner 208 is configured to deform towards the second exterior panel 204. In other embodiments, deformable liner may be mounted between exterior panels 202 or 204 and supported, for example, by a portion of the internal frame structure so that it may act in a bidirectional manner.

In some embodiments, movable barrier 200 comprises a hinge (e.g., hinge mechanism 626 in FIG. 6) to secure movable barrier 200 to an adjacent supporting structure, such as a wall or bulkhead, and to allow movable barrier 200 to swing open and closed. For example, a hinged movable barrier allows flight crew to open movable barrier 200 during certain phases of a flight, such as boarding, and to close it during other phase of the flight, such as take-off, landing, etc. Various types of hinges may be used, including a piano hinge, butt hinge, flush hinge, pivot hinge, barrel hinge, or spring hinge, to name a few.

In some examples, movable barrier 200 further comprises a latch mechanism (e.g., latch mechanism 640 in FIG. 6) to secure movable barrier 200 to an adjacent supporting structure, such as a wall or bulkhead. Various types of latch mechanisms may be used including a cam or twist latch, such as a door knob or T-handle, a hook latch, a pull down or toggle latch, a slam or push-to-close latch, or a slide or swing bolt latch, to name a few. The latch mechanism may be used to secure movable barrier 200 in a closed position (e.g., movable barrier 100a in FIG. 1A).

In some examples, a latch mechanism may include a locking mechanism (e.g., locking mechanism 642 in FIG. 6) to restrict persons from opening movable barrier 200 when locked. For example, a manual or an electronic locking mechanism may be used. In some examples, an electronic latching mechanism may be further coupled to pressure sensors or an electronic control system and configured so that the electronic latching mechanism is released when a pressure differential between the two outer sides 202a and 202b of the barrier 200 exceeds a threshold, which may be the same or a different threshold that causes the deformable liner 208 to deform. Notably, these are just some examples and other latching mechanisms capable of securing movable barrier 200 may be used.

FIGS. 3A, 3B, 3C, 3D, and 3E depict a movable barrier 300 and a single segment of a movable barrier 300 from an overhead, sectional view. Cross-sections of a frame 310 are also depicted.

Figure 3A:
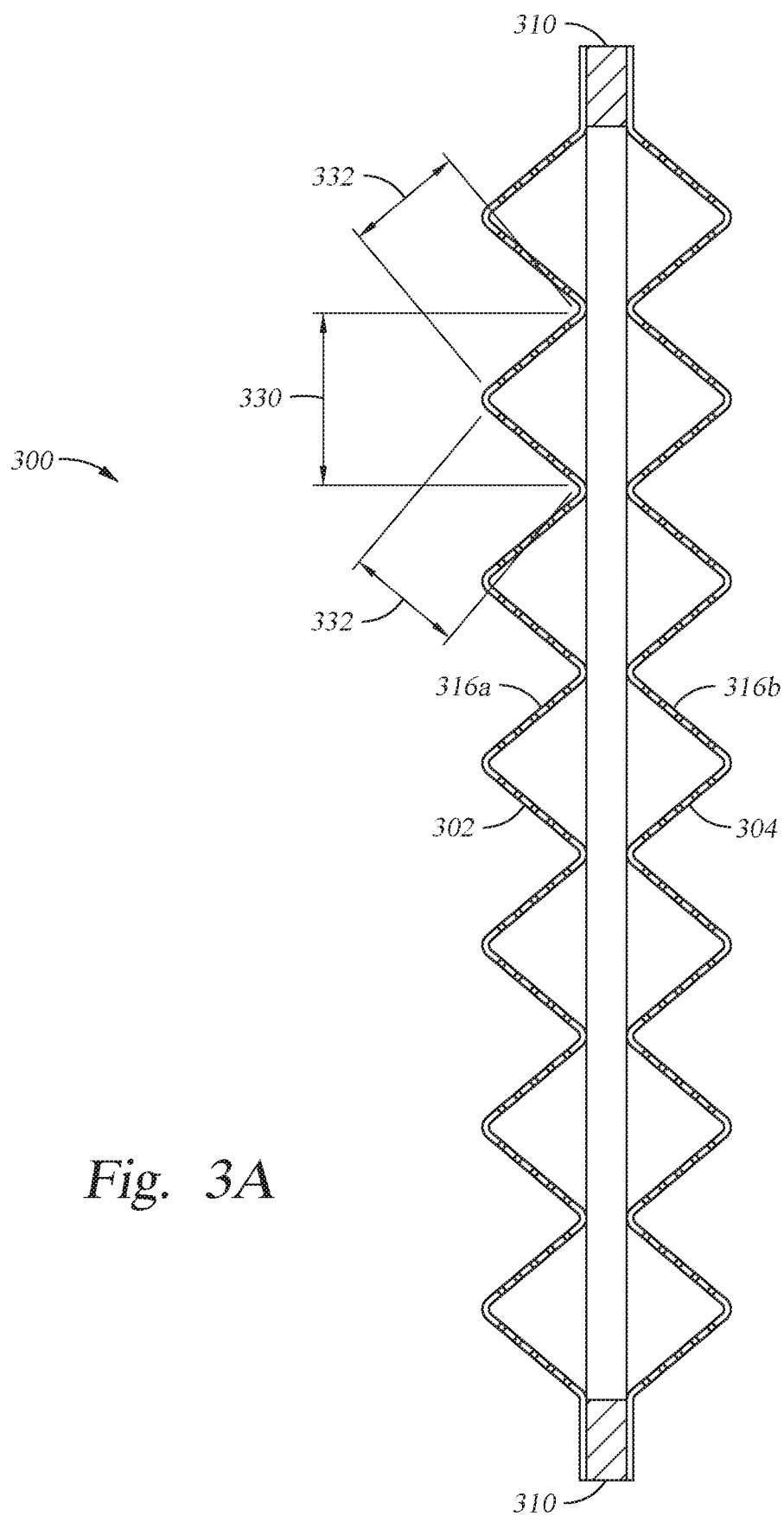
FIG. 3A depicts dimensions and features affecting airflow properties of an embodiment of a movable barrier.

As depicted in FIG. 3A, the non-planar profiles 316a and 316b of exterior panels 302 and 304 increase the surface area of the exterior panels 302 and 304 for each segment length 330. The increased surface area increases the amount of perforations in segment length 330 and thereby beneficially increases the amount of air that can flow through segment length 330. For example, the number of perforations along surface lengths 332 are greater than along segment length 330.

Figure 3B:
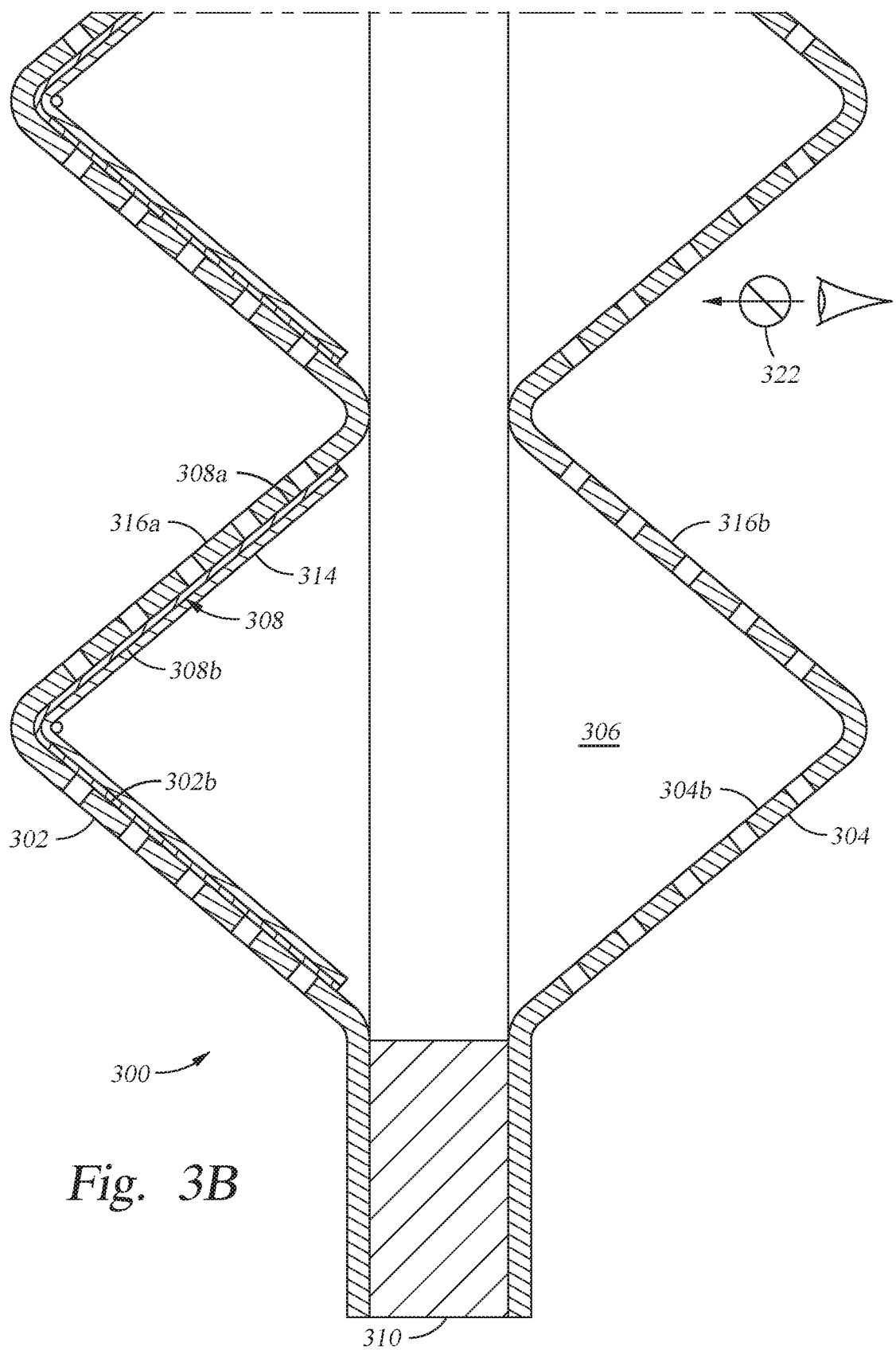
FIG. 3B depicts interior components of an embodiment of a movable barrier in a default state.

FIG. 3B depicts movable barrier 300 in a default state, which is when a pressure differential from a first side 308a to a second side 308b of deformable liner 308 is below a threshold. In this example, deformable liner 308 is disposed within cavity 306 and restricts vision 322 when in the default state. Further in this example, deformable liner 308 is affixed against a first inner side 302b of first exterior panel 302 by a spring mechanism 314. In other examples, deformable liner 308 may be affixed to a second inner side 304b of second exterior panel 304.

Deformable liner 308 blocks a person from seeing through movable barrier 300. For example, the configuration depicted in FIG. 3B may prevent a person in the main cabin of an aircraft from seeing into a flight deck hallway of the aircraft. This beneficially increases security of flight personnel operating in the flight deck hallway because it prevents potential bad actors from anticipating actions of flight crew.

In the example depicted in FIG. 3B, if air pressure acting on first side 308a of deformable liner 308 exceeds a threshold difference with the air pressure acting on the second side 308b of deformable liner 308, the differential pressure will cause deformable liner 308 to overcome the bias pressure of spring mechanism 314 and deform into cavity 306, allowing airflow through exterior panels 302 and 304 during a differential pressurization event, such as a decompression in an aircraft on second side 308b. In some examples, spring mechanism 314 is configured to allow deformation of deformable liner 308 at or about 0.25 PSI in differential pressure, however, other spring pressures may be used to suit the implementation.

Figure 3C:
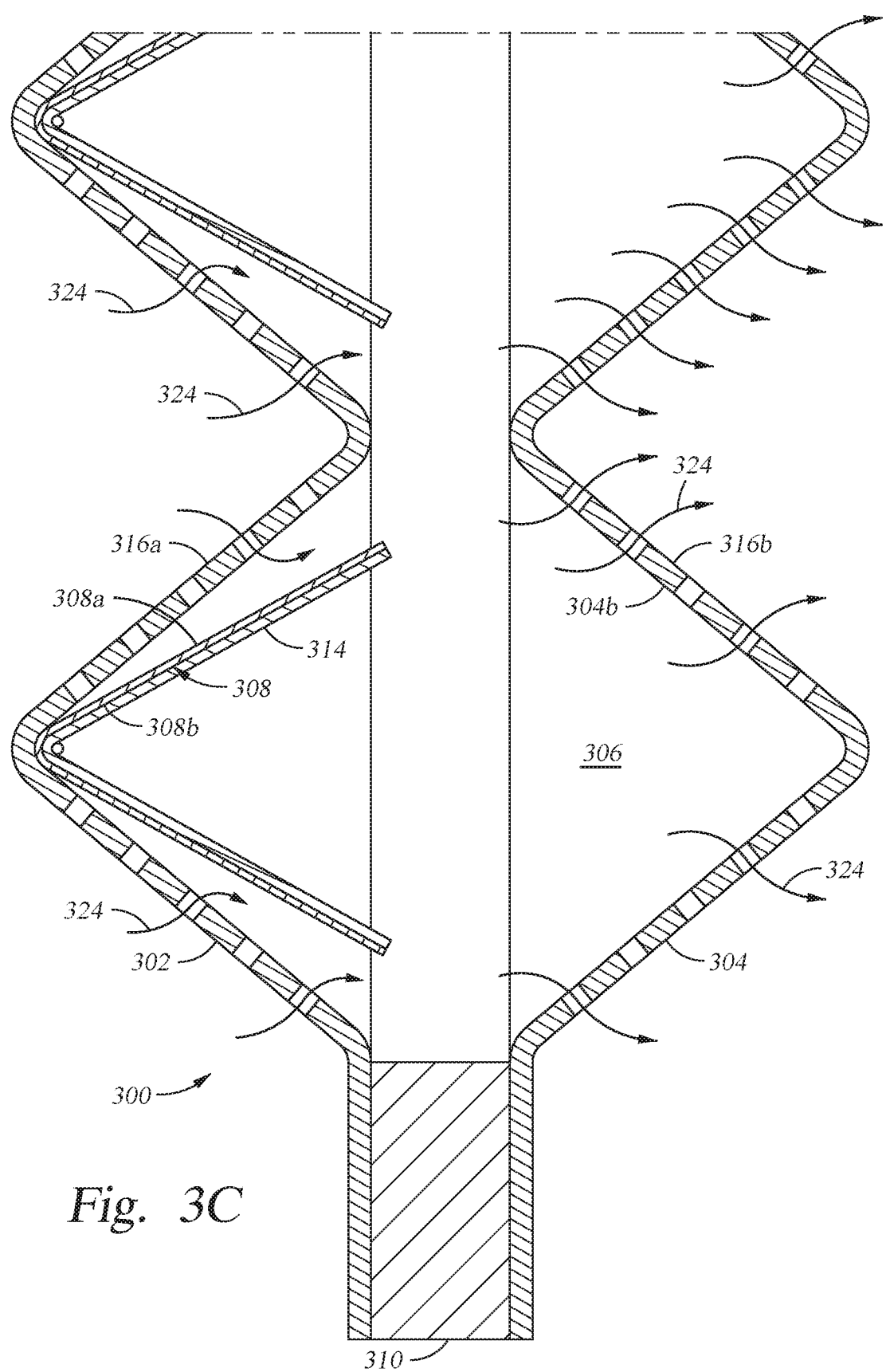
FIG. 3C depicts the movable barrier from FIG. 3B during a differential pressurization event.

FIG. 3C depicts movable barrier 300 during a differential pressurization event in which the pressure on first side 308a of deformable liner 308 exceeds a threshold differential with the pressure on second side 308b, such as if a decompression occurs on side 308b. The deformation of deformable liner 308 allows airflow 324 to rapidly traverse movable barrier 300 so pressure is equalized on either side of movable barrier 300 without damage to movable barrier 300 or to surrounding structures.

In this example, airflow 324 can only flow one direction during a differential pressurization event because an inner side 302b of exterior panel 302 prevents liner 308 from deforming when the pressure gradient is in the other direction. However, in other embodiments, deformable liner 308 may be configured such that a pressure differential exceeding a threshold in either direction causes the deformable liner to deform and allow airflow.

Figure 3D:
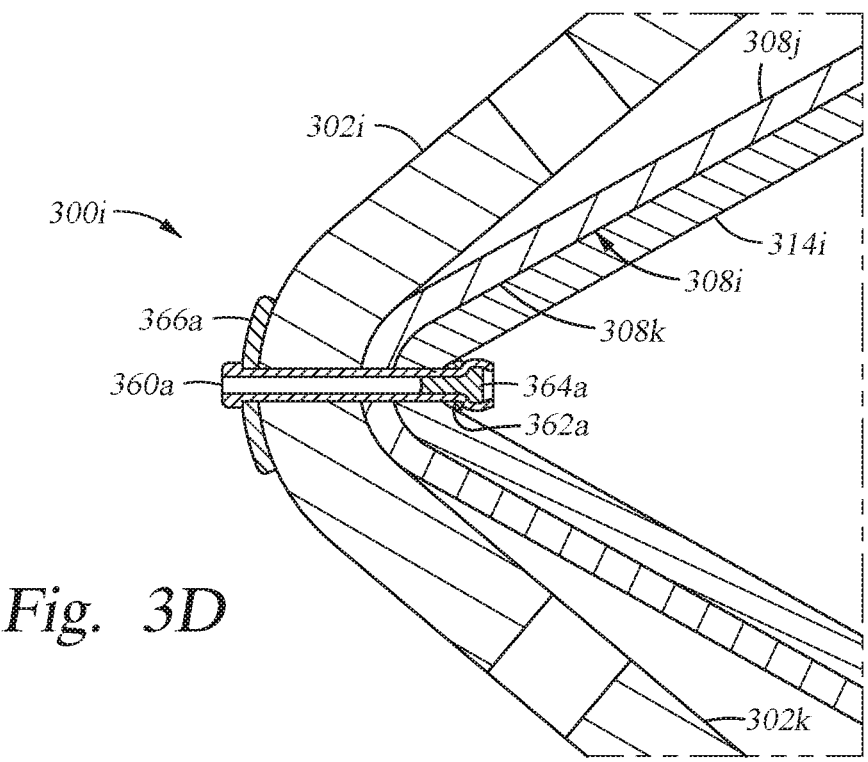
FIG. 3D depicts a fastening mechanism for a deformable liner of an embodiment of a movable barrier during a differential pressurization event.

FIG. 3D depicts a movable barrier 300i during a differential pressurization event, such as if a decompression occurs on a second side 308k of a deformable liner 308i. When movable barrier 300i is in a default state, a spring mechanism 314i holds a first side 308j of deformable liner 308i against an inner side 302k of an exterior panel 302i. Spring mechanism 314i is secured to exterior panel 302i by a rivet head 360a, a rivet washer 366a, a rivet spacer 362a, and a retained mandrel head 364a. While a blind rivet is shown, other types of rivets can be used. In some examples, rivet washer 366a and/or rivet spacer 362a are not used. In other examples, a nut and bolt are used instead of rivet head 360a and retained mandrel head 364a. In additional examples, deformable liner is flexible and does not use spring mechanism 314i.

Figure 3E:
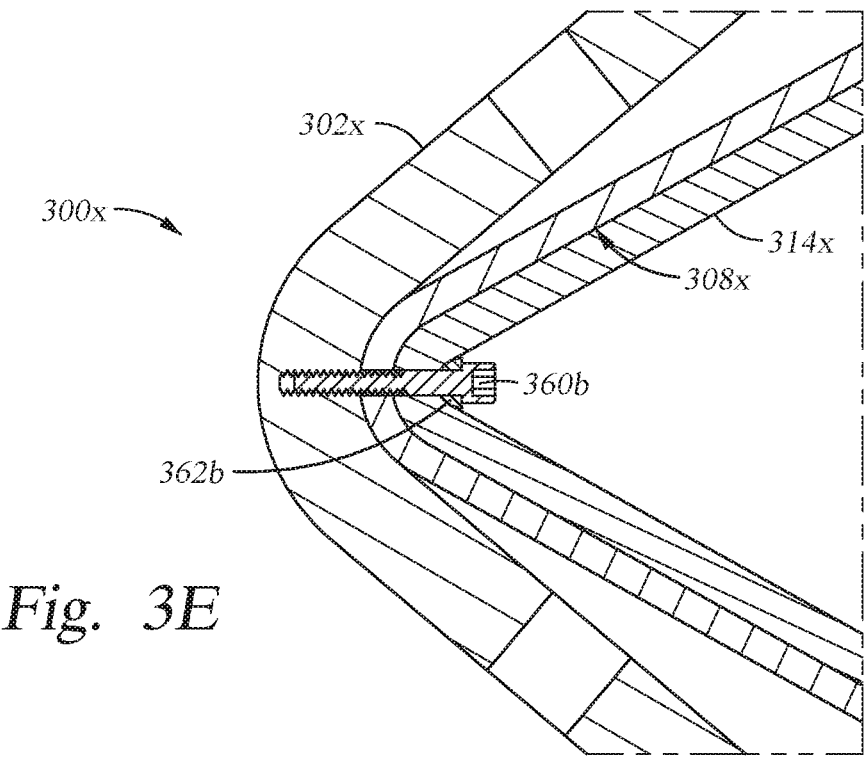
FIG. 3E depicts another fastening mechanism for a deformable liner of an embodiment of a movable barrier during a differential pressurization event.

FIG. 3E depicts a movable barrier 300x during a differential pressurization event, similar to FIG. 3D. A spring mechanism 314x secures a deformable liner 308x to an exterior panel 302x. A screw 360b and a screw spacer 362b secures spring mechanism 314x to and threads into exterior panel 302x. In some examples, screw spacer (e.g. a washer) 362b is not used. In other examples, deformable liner 308x is flexible and does not use spring mechanism 314x.

Example Movable Barrier with Bidirectional Liner

Embodiments of movable barriers may be configured with bidirectional liners. For example, in a movable barrier having a first exterior panel and a second exterior panel connected to an internal frame, a deformable liner may be disposed within a cavity formed between the first and second exterior panel so that it can deform in either direction. In some embodiments, the liner may be mounted to internal structures of the movable barrier, such as frame, or another purpose built structure for retaining the liner. In such configurations, the liner may be configured to deform when pressure on either side exceeds a threshold pressure difference, as generally described above.

Example Movable Barrier without a Frame

Figure 4:
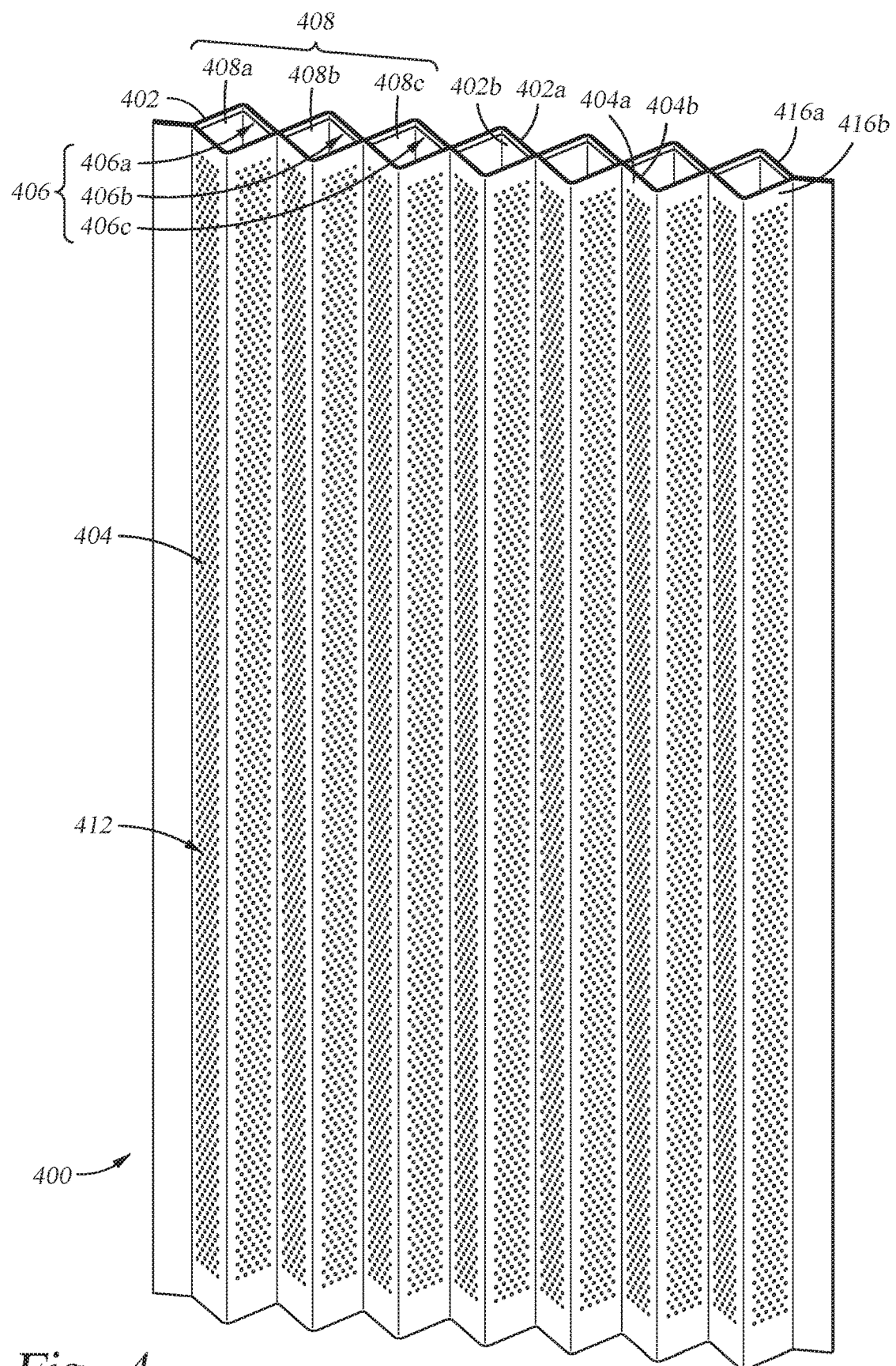
FIG. 4 depicts an embodiment of a movable barrier without a frame.

FIG. 4 depicts another embodiment of a movable barrier 400. In this example, a first inner side 402b of a first exterior panel 402 is connected to a first inner side 404b of a second exterior panel 404 such that together they form the rigid structure of movable barrier 400. Exterior panels 402 and 404 may be connected together through different means, such as by welding, adhesive, rivets, or other fasteners, to name just a few examples.

In the example depicted in FIG. 4, exterior panels 402 and 404 have a first outer side 402a and a second outer side 404a. Further, a plurality of cavities 406 (e.g., 406a, 406b, 406c) are formed between exterior panels 402 and 404 and a plurality of deformable liners 408 (e.g., 408a, 408b, 408c) are affixed, with one or more in each cavity (e.g., 406a). As above, one or more of the deformable liners (e.g., 408a) may be porous.

In this example, the deformable liner (e.g., 408a) in each cavity (e.g., 406a) is affixed to an inner side 402b or 404b of one of the exterior panels 402 or 404, such as by the means described above.

Notably, with the multiple cavities and a plurality of deformable liners, subsets of the plurality of deformable liners may be affixed to different inner sides of movable barrier 400. In this way, a bidirectional pressure relief function is accomplished despite individual deformable liners being unidirectional based on their mounting location. For example, half of the deformable liners may be affixed against inner side 402b and another half may be affixed against inner side 404b by the means described above. Other ratios are possible.

Further in the example depicted in FIG. 4, exterior panels 402 and 404 have a plurality of perforations 412 and non-planar profiles 416a and 416b, as described above. And as above, the deformable liners 408 restrict vision through movable barrier 400.

In some examples movable barrier 400 comprises a hinge (e.g., hinge mechanism 626 in FIG. 6) to secure the movable barrier to an adjacent supporting structure, such as a wall or bulkhead, as described above. Additionally, as described above, movable barrier 400 may include a latching mechanism which may be manual or electronic in various embodiments.

Example Foldable Movable Barrier

Figure 5A:
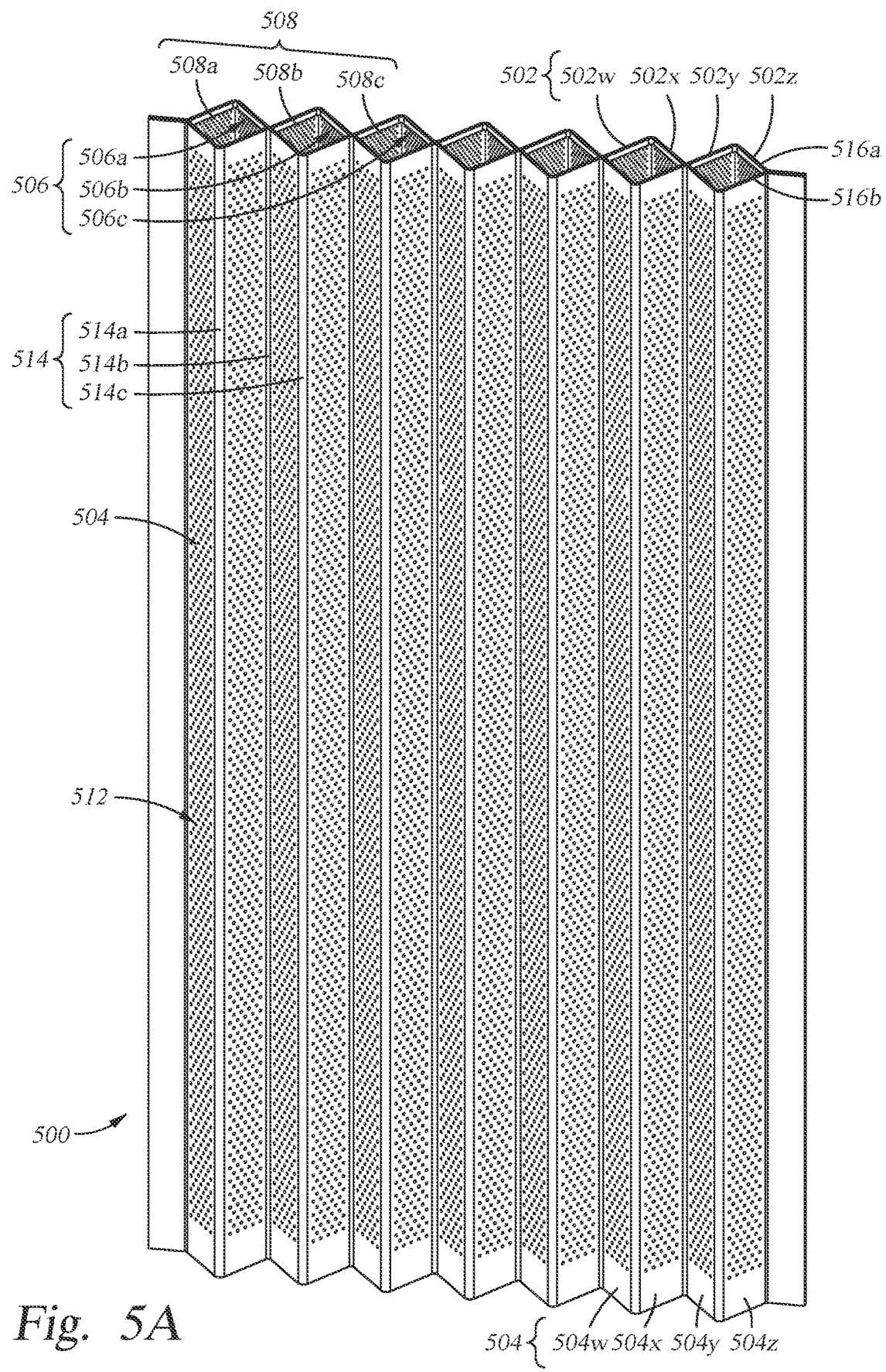
FIG. 5A depicts an embodiment of a foldable movable barrier.
Figure 5B:
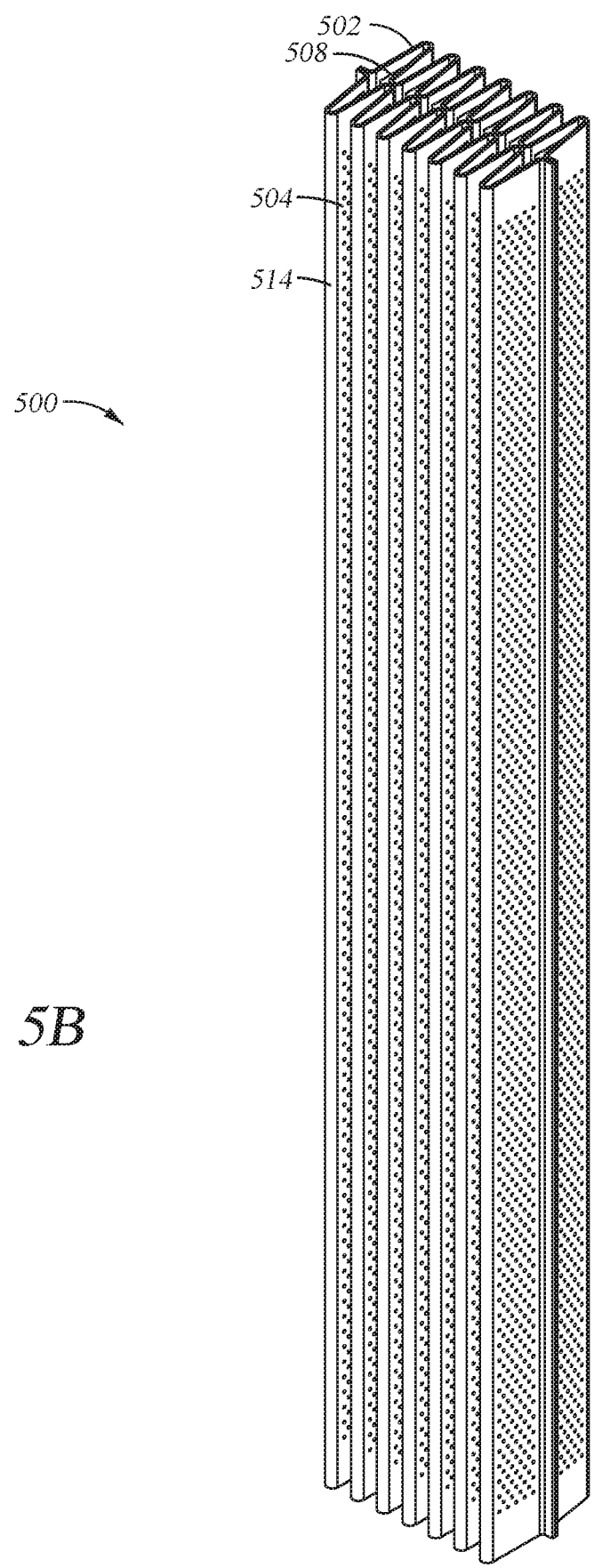
FIG. 5B depicts the movable barrier from FIG. 5A folded on itself.

FIGS. 5A and 5B depict an embodiment of a foldable movable barrier 500.

In particular, FIG. 5A depicts an embodiment of a foldable movable barrier 500 in a partially extended position. In this example, a first exterior panel 502 is comprised of a plurality of subpanels (e.g., 502w, 502x, 502y, 502z) and a second exterior panel 504 is comprised of a variety of subpanels (e.g., 504w, 504x, 504y, 504z). Exterior panels 502 and 504 have a plurality of perforations 512 and non-planar profiles 516a and 516b as described above. Exterior panels 502 and 504 may be fastened together (e.g., along mating seam lines) through different flexible means such as hinges or flexible joints.

In this example, subpanels (e.g., 502z) are connected by a plurality of joints 514 (e.g., 514a, 514b, 514c) to allow subpanels (e.g., 502z) to fold on themselves. The plurality of joints (e.g., 514a) are shown as piano hinges, in this embodiment, and are connected longitudinally to an outside surface of subpanels (e.g., 504z). In other examples, plurality of joints (e.g., 514a) attach to an inside surface of subpanels (e.g., 504z). The subpanels (e.g., 504z) and plurality of joints (e.g., 514a) beneficially allow movable barrier 500 to fold upon itself when opened for compact stowage.

In the example depicted in FIG. 5A, a plurality of cavities 506 (e.g., 506a, 506b, 506c) are formed between exterior panels 502 and 504, and a plurality of deformable liners 508 (e.g., 508a, 508b, 508c) are affixed to exterior panels 502 and 504 as described above. As above, one or more of the deformable liners 508 (e.g., 508a) may be porous. Further as above, the deformable liners may all be mounted to the same inner side of movable barrier 500, or to different inner sides in order to allow a bidirectional pressure relief function.

FIG. 5B depicts movable barrier 500 in a folded position. When folded, movable barrier 500 is more easily stowed.

Figure 6:
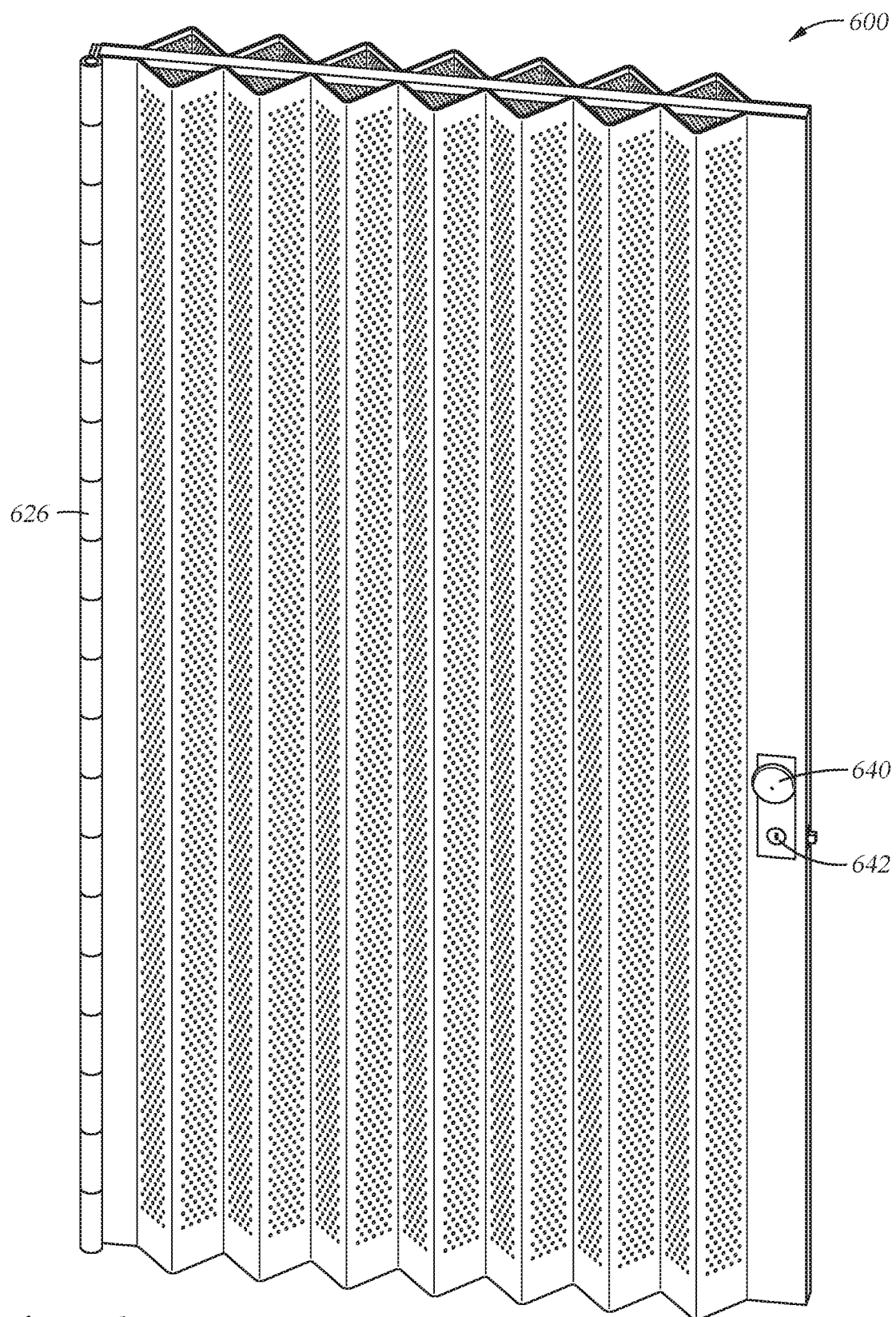
FIG. 6 depicts connecting features of an embodiment of a movable barrier.

FIG. 6 depicts additional features that may be employed with the various embodiments of movable barriers described herein, including movable barrier 600.

In this example, movable barrier 600 includes a hinge mechanism 626 to connect movable barrier 600 to an adjacent supporting structure, such as a wall or bulkhead, and to allow movable barrier 600 to swing open and closed as described above. Additionally, movable barrier 600 includes a latch mechanism 640 to secure movable barrier 600 in a closed position as described above. In some examples, latch mechanism 640 includes a locking mechanism 642 as described above.

Figure 7:
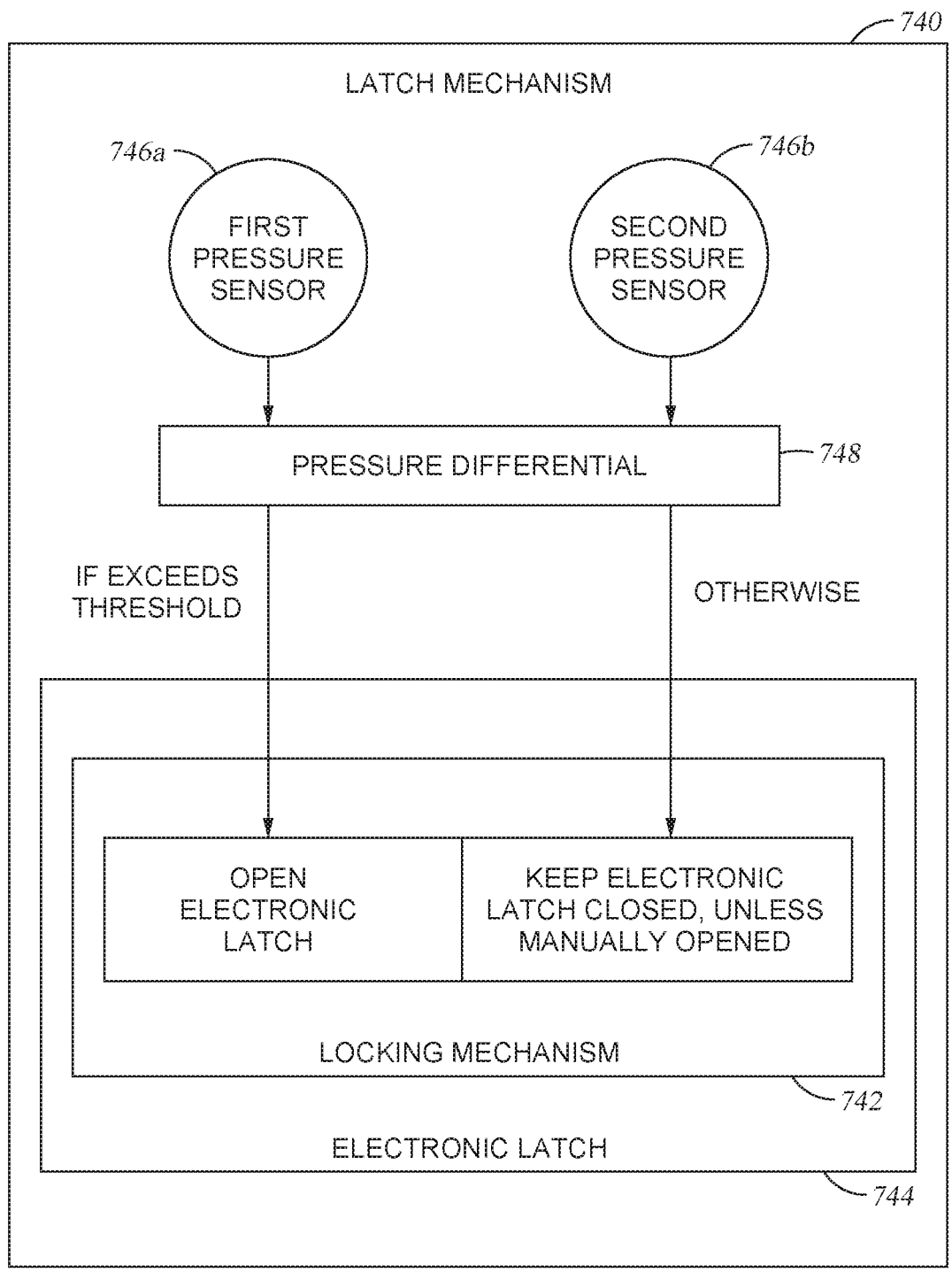
FIG. 7 depicts an embodiment of a pressure-sensing latch mechanism.

FIG. 7 depicts an embodiment of a pressure-sensing latch mechanism 740, which uses a plurality of pressure sensors (e.g., 746a, 746b) to calculate a pressure differential 748 on opposite sides of a movable barrier, such as those described above. In one example, a first pressure sensor 746a is located in the flight deck hallway of an aircraft and a second pressure sensor 746b is located in the main cabin. If pressure differential 748 exceeds a threshold, which may be the same or a different threshold as described above, a locking mechanism 742 of an electronic latch 744 releases, allowing movable barrier to open as described above. Locking mechanism 742 may additionally be opened manually by a person as described above.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. A movable barrier, comprising:
   a frame having a first side and a second side parallel to the first side, wherein the first side and the second side are planar;
   a first exterior panel connected to the first side of the frame and comprising:
      a first non-planar profile; and
      a first plurality of perforations;
   a second exterior panel connected to the second side of the frame and comprising:
      a second non-planar profile; and
      a second plurality of perforations;
   a cavity defined between the first exterior panel and the second exterior panel; and
   a liner disposed within the cavity and configured to:
      deform when an air pressure differential acting on a first side of the liner exceeds a first pressure differential threshold and allow increased airflow through the movable barrier.

2. The movable barrier of claim 1, wherein the liner is affixed to one of the first side or the second side of the frame.

3. The movable barrier of claim 1, wherein the liner is affixed to an inner side of the first exterior panel or the second exterior panel.

4. The movable barrier of claim 3, wherein the liner is affixed to the inner side of the first exterior panel or the second exterior panel by one of a biasing mechanism or an adhesive.

5. The movable barrier of claim 1, wherein the liner is porous.

6. The movable barrier of claim 1, wherein a hinge mechanism retains the movable barrier to a supporting structure.

7. The movable barrier of claim 1, wherein a latch mechanism is configured to secure the movable barrier to a supporting structure.

8. The movable barrier of claim 7, wherein the latch mechanism comprises an electronic latch coupled to a plurality of pressure sensors configured to release the movable barrier when an air pressure differential on opposite sides of the movable barrier exceeds a second pressure differential threshold.

9. A movable barrier, comprising:
   a first exterior panel, comprising:
      a first inner side;
      a first outer side;
      a first non-planar profile; and
      a first plurality of perforations;
   a second exterior panel, comprising:
      a second inner side;
      a second outer side;
      a second non-planar profile;
      a second plurality of perforations,
      wherein:
         one or more portions of the first inner side of the first exterior panel are directly connected to one or more portions of the second inner side of the second exterior panel, and
         the first exterior panel and the second exterior panel form a structure of movable barrier;
   a plurality of cavities formed between the first exterior panel and the second exterior panel; and
   a plurality of liners disposed within the plurality of cavities and configured to: deform when an air pressure acting on a first side of the plurality of liners exceeds a first pressure differential threshold and allow increased airflow through the movable barrier.

10. The movable barrier of claim 9, wherein each liner of the plurality of liners is affixed to either the first inner side of the first exterior panel or the second inner side of the second exterior panel.

11. The movable barrier of claim 9, wherein every liner of the plurality of liners is affixed to either the first inner side of the first exterior panel or the second inner side of the second exterior panel.

12. The movable barrier of claim 9, wherein each liner of the plurality of liners is retained by a biasing mechanism.

13. The movable barrier of claim 9, wherein each liner of the plurality of liners is porous.

14. The movable barrier of claim 9, wherein a hinge mechanism attaches the movable barrier to an adjacent wall or structure.

15. The movable barrier of claim 9, wherein:
   the first exterior panel is comprised of a plurality of subpanels connected by a first plurality of joints; and
   the second exterior panel is comprised of a plurality of subpanels connected by a second plurality of joints.

16. The movable barrier of claim 15, wherein the movable barrier is foldable.

17. The movable barrier of claim 9, wherein a latch mechanism is configured to secure the movable barrier to a supporting structure.

18. The movable barrier of claim 17, wherein the latch mechanism comprises an electronic latch coupled to a plurality of pressure sensors configured to release the movable barrier when an air pressure differential on opposite sides of the movable barrier exceeds a second pressure differential threshold.

19. A movable barrier, comprising:
   a frame having a first side and a second side parallel to the first side;
   a first exterior panel connected to the first side of the frame and comprising:

a first non-planar profile, wherein the first non-planer profile comprises a corrugated profile comprising a first plurality of alternating ridges and grooves; and
a first plurality of perforations;
a second exterior panel connected to the second side of the frame and comprising:
a second non-planar profile, wherein the second non-planar profile comprises the corrugated profile comprising a second plurality of alternating ridges and grooves; and
a second plurality of perforations;
a cavity defined between the first exterior panel and the second exterior panel; and
a liner disposed within the cavity and configured to: deform when an air pressure differential acting on a first side of the liner exceeds a pressure differential threshold and allow increased airflow through the movable barrier.

20. A movable barrier, comprising:
a first exterior panel, comprising:
a first inner side;
a first outer side;
a first non-planar profile; and
a first plurality of perforations;
a second exterior panel, comprising:
a second inner side;
a second outer side;
a second non-planar profile;
a second plurality of perforations,
wherein:
the first non-planer profile comprises a first corrugated profile comprising a first plurality of alternating ridges and grooves,
the second non-planar profile comprises a second corrugated profile comprising a second plurality of alternating ridges and grooves, and
one or more portions of the first inner side of the first exterior panel are connected to one or more portions of the second inner side of the second exterior panel;
a plurality of cavities formed between the first exterior panel and the second exterior panel; and
a plurality of liners disposed within the plurality of cavities and configured to: deform when an air pressure acting on a first side of the plurality of liners exceeds a pressure differential threshold and allow increased airflow through the movable barrier.

* * * * *